United States Patent
Bühring

(10) Patent No.: US 10,479,299 B2
(45) Date of Patent: Nov. 19, 2019

(54) METHOD FOR CONTROLLING A CONSUMER OF A LOW-VOLTAGE ON-BOARD ELECTRICAL SYSTEM

(71) Applicant: Volkswagen Aktiengesellschaft, Wolfsburg (DE)

(72) Inventor: Kai Bühring, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 68 days.

(21) Appl. No.: 15/663,705

(22) Filed: Jul. 29, 2017

(65) Prior Publication Data

US 2017/0327063 A1 Nov. 16, 2017

Related U.S. Application Data

(63) Continuation of application No. PCT/EP2016/052683, filed on Feb. 9, 2016.

(30) Foreign Application Priority Data

Feb. 11, 2015 (DE) .................. 10 2015 202 453

(51) Int. Cl.
*B60R 16/03* (2006.01)
*H02J 1/14* (2006.01)
(52) U.S. Cl.
CPC ............... *B60R 16/03* (2013.01); *H02J 1/14* (2013.01)
(58) Field of Classification Search
CPC .................................. B60R 16/03; H02J 1/14
USPC ........................................................ 307/9.1
See application file for complete search history.

(56) References Cited

U.S. PATENT DOCUMENTS

| 5,991,669 A | 11/1999 | Dominke et al. |
| 6,301,528 B1 | 10/2001 | Bertram et al. |
| 6,592,412 B1 | 7/2003 | Geil et al. |
| 2002/0113441 A1 | 8/2002 | Obayashi |
| 2004/0036356 A1 | 2/2004 | Bischof et al. |
| 2008/0224537 A1 | 9/2008 | Uhl |
| 2009/0026838 A1 | 1/2009 | Abe |
| 2014/0336861 A1 | 11/2014 | Huber et al. |

(Continued)

FOREIGN PATENT DOCUMENTS

| CN | 103998312 A | 8/2014 |
| DE | 2324457 A1 | 11/1974 |
| DE | 3142913 A1 | 5/1983 |

(Continued)

OTHER PUBLICATIONS

Search Report including Provisional Assessment of Patentability issued by the German Patent and Trademark Office for German Patent Application No. DE 10 2015 202 453.9, dated Nov. 13, 2015.

(Continued)

*Primary Examiner* — John W Poos
(74) *Attorney, Agent, or Firm* — Manfred Beck, P.A.

(57) ABSTRACT

A method for controlling consumers of a low-voltage on-board electrical system of a motor vehicle reduces, when it is identified that a high-current consumer is connected, the current consumption of another consumer by an amount that corresponds to the current consumption of the high-current consumer. A control apparatus for controlling consumers of a low-voltage on-board electrical system of a motor vehicle is also provided.

7 Claims, 2 Drawing Sheets

(56) References Cited

U.S. PATENT DOCUMENTS

2015/0314740 A1* 11/2015 Reichow .............. B60R 16/03
701/36

FOREIGN PATENT DOCUMENTS

| | | |
|---|---|---|
| DE | 19709317 A1 | 9/1998 |
| DE | 19857916 A1 | 6/2000 |
| DE | 19931144 A1 | 7/2000 |
| DE | 10162522 A1 | 7/2002 |
| DE | 10164463 A1 | 6/2003 |
| DE | 10233822 A1 | 2/2004 |
| DE | 10252292 A1 | 6/2004 |
| DE | 10312553 A1 | 7/2004 |
| DE | 10336815 A1 | 3/2005 |
| DE | 102005047011 A1 | 4/2007 |
| DE | 102005057306 A1 | 6/2007 |
| DE | 102006026404 A1 | 12/2007 |
| DE | 102008034812 A1 | 2/2009 |
| EP | 0601300 A1 | 6/1994 |
| EP | 1405767 A1 | 4/2004 |
| EP | 1564863 A1 | 8/2005 |
| EP | 1626322 A1 | 2/2006 |
| EP | 2579412 A1 | 4/2013 |
| WO | 01/00485 A1 | 1/2001 |
| WO | 03/016097 A1 | 2/2003 |
| WO | 2007/141069 A1 | 12/2007 |
| WO | 2012/163421 A1 | 12/2012 |
| WO | 2014/086651 A2 | 6/2014 |
| WO | 2014/133859 A2 | 9/2014 |

OTHER PUBLICATIONS

International Search Report for International Application No. PCT/EP2016/052683 and translation thereof, dated Apr. 29, 2016.

International Preliminary Report on Patentability for International Application No. PCT/EP2016/052683 including Written Opinion of the International Searching Authority and translation thereof, dated Aug. 15, 2017.

Office Action, dated Oct. 19, 2018, issued by the National Intellectual Property Administration, P.R. China for Chinese Patent Application No. 201680004213.9, which is related to U.S. Appl. No. 15/663,705; a Search Reprt and a German translation of a portion of the Office Action for Chinese Patent Application No. 201680004213.9 being attached to the Office Action.

Office Action, dated May 3, 2019, issued by the European Patent Office for European Patent Application No. 16 706 147.2, which is related to U.S. Appl. No. 15/663,705.

Supplementary Search Report dated Jun. 19, 2019, issued by the National Intellectual Property Administration, P.R. China for Chinese Patent Application No. 201680004213.9, which is related to U.S. Appl. No. 15/663,705.

Office Action, dated Jun. 27, 2019, issued by the National Intellectual Property Administration, P.R. China for Chinese Patent Application No. 201680004213.9, which is related to U.S. Appl. No. 15/663,705.

* cited by examiner

METHOD FOR CONTROLLING A CONSUMER OF A LOW-VOLTAGE ON-BOARD ELECTRICAL SYSTEM

CROSS-REFERENCE TO RELATED APPLICATIONS

This application is a continuation, under 35 U.S.C. § 120, of copending International Application No. PCT/EP2016/1052683, filed Feb. 9, 2016, which designated the United States; this application also claims the priority, under 35 U.S.C. § 119, of German Patent Application No. DE 10 2015 202 453.9, filed Feb. 11, 2015; the prior applications are herewith incorporated by reference in their entirety.

BACKGROUND OF THE INVENTION

Field of the Invention

The invention relates to an on-board electrical system of a motor vehicle, a motor vehicle having such an on-board electrical system and a method for switching an isolating element of an on-board electrical system.

An on-board electrical system of a vehicle usually contains a range of on-board electrical system consumers, a starter, an electrical energy store for supplying the on-board electrical system consumers and the starter with power and isolating switches. When starting an engine of a vehicle, the on-board electrical system consumers can be isolated from the energy store with the aid of the isolating switches in order to supply the starter with enough power.

Conventional on-board electrical systems may additionally contain dynamic consumers, the operation of which can lead to voltage fluctuations in the on-board electrical system. As a result, it can be dangerous to operate on-board electrical system consumers that are sensitive to voltage fluctuations. These voltage fluctuations have been prevented until now by using a multiplicity of complex components such as DC voltage converters (DC/DC converters) and adjustable diodes.

In disadvantageous operating cases, the performance limits of the DC/DC voltage converter are exceeded by an excessively high load on the low-voltage on-board electrical system. This results in power being drawn from the low-voltage battery, which leads to a higher load due to increased cyclization. In the worst case, for example when the battery is discharged or the battery terminal is not connected, the on-board electrical system may fail as a consequence of undervoltage.

According to European Patent Application Publication No. EP 0 601 300 A1 various driving states are defined in the control device of the vehicle, in each case prescribed types of electrical consumers being assigned to these states. It is then possible to determine, on the basis of the signals supplied by sensors and depending on the driving state, which types of consumers should be disconnected or reconnected individually or in groups, simultaneously or in succession in accordance with a prescribed sequence. In order to relieve the load on the electrical on-board system, a disconnection hierarchy or reconnection hierarchy is stipulated both in the case of different load states of the internal combustion engine and in the case of the disconnection or connection thereof for the electrical consumers, the hierarchy making it possible, on the one hand, to optimally save energy and, on the other hand, to fully maintain the operational and driving safety of the vehicle.

SUMMARY OF THE INVENTION

It is accordingly an object of the invention to provide an improved method for controlling a consumer of a low-voltage on-board electrical system of a motor vehicle and a correspondingly configured control configuration for a motor vehicle which overcome the above-mentioned disadvantages of the heretofore-known methods and devices of this general type.

With the foregoing and other objects in view there is provided, in accordance with the invention, a method for controlling a consumer of a low-voltage on-board electrical system of a motor vehicle, the method including:

providing a high-current consumer of the low-voltage on-board electrical system, and providing a further consumer of the low-voltage on-board electrical system; and reducing a current consumption of the further consumer by an amount that corresponds to a current consumption of the high-current consumer, when it is identified that the high-current consumer is connected.

In other words, according to the invention there is provided a method for controlling a consumer of a low-voltage on-board electrical system of a motor vehicle, in which, when it is identified (S1) that a high-current consumer is connected, the current consumption of another consumer is reduced (S3) by an amount that corresponds to the current consumption of the high-current consumer.

Exemplary embodiments of a method for controlling a consumer of a low-voltage on-board electrical system of a motor vehicle are described below, in which, when it is identified that a high-current consumer is connected, the current consumption of another consumer is reduced by an amount that corresponds to the current consumption of the high-current consumer.

The method can be used in any motor vehicle, but preferably in a hybrid vehicle, in which a low-voltage on-board electrical system is fed by a high-voltage on-board electrical system through the use of a DC voltage converter.

The method can be implemented as control software, for example in an energy manager of the motor vehicle.

The current consumer (power consumer) that has its current consumption (power consumption) reduced may be any consumer of a low-voltage motor vehicle on-board electrical system. However, the consumer is advantageously a consumer with a sufficiently high current consumption such that a reduction of the current consumption of the consumer leads to a substantial reduction of the overall load on the low-voltage on-board electrical system.

In accordance with a mode of the invention, the consumer, whose current value is reduced, is a PWM (pulse width modulation) cooling fan, wherein the PWM cooling fan is driven in a differentiated manner by a pulse width modulation such that a current consumption is adjustable.

It is particularly advantageous when the consumer that has its current value reduced is a consumer that reacts to a reduction of the current value by acting with inertia. This ensures that, for example, instantly disconnecting the consumer does not lead immediately to critical impairment of the operability of the motor vehicle as a whole. Thus, according to a mode of the invention, the consumer that has its current value reduced is a consumer whose effect reacts with inertia to a reduction of its current value.

The consumer whose current value is reduced may be the cooling fan, for example, since the cooling system has a certain inertia. If the cooling fan is disconnected spontaneously, this does not immediately lead to overheating of the engine. Instead, the temperature of the cooling system increases only slowly after the cooling fan has been disconnected.

It is particularly advantageous when the consumer whose current value is reduced has an inductance such that an induction voltage is generated when the current value of the consumer is reduced, the induction voltage additionally feeding the low-voltage on-board electrical system. This has the advantage that shutting down the consumer not only reduces the power drawn by the consumer but even allows additional power to be fed to the low-voltage on-board electrical system at times of current drain peaks.

The high-current consumer may be any consumer of a low-voltage motor vehicle on-board electrical system. The term high-current consumer should be understood in this case as meaning that the current consumption of the high-current consumer is not insignificant for the load on the on-board electrical system, i.e. in critical operating states, for example, connecting the high-current consumer could entail possible disadvantageous effects for the operating situation, such as a breakdown in the low voltage or failure of a DC voltage converter that feeds the low-voltage electrical system, for example.

The high-current consumer is preferably a consumer that is connected for only a short period of time. This has the advantage that connecting the high-current consumer gives rise to only short current peaks, it being possible to temporarily compensate for these peaks by disconnecting another consumer in a time-restricted manner.

The high-current consumer may, for example, be a gearbox pump (or, respectively, an oil pump), which is used for the normal shifting or switching operation and/or for cooling. In specific operating states, a gearbox pump of this kind is activated only for a short period of time, such that it is possible to temporarily compensate for a current peak that is brought about by activating the gearbox pump by disconnecting another consumer, such as a cooling fan, for example, in a time-restricted manner.

Accordingly, the present invention makes it possible to consider various consumers together and therefore to "interlock" or, respectively, interconnect various consumers. For example, under specific conditions, the cooling fan having a high power is "interlocked" or, respectively, interconnected with the high power of the gearbox pump. At the moment when the gearbox pump is switched on, the cooling fan is reduced to the lowest possible volume flow for a short time. This takes advantage of the inertia of the cooling system. If the gearbox pump has built up the required pressure, the cooling fan can immediately speed up again.

In the method, a control signal that indicates a critical load on the low-voltage electrical system is advantageously evaluated and wherein the current consumption of the other consumer is reduced if the control signal indicates a critical load on the low-voltage electrical system. In particular, the control signal can indicate that a large number of consumers require power. The control signal can also be generated, for example, when too much power is drawn from a low-voltage battery, in particular when the battery no longer contains enough power to ensure a stable supply of the low-voltage on-board electrical system. Alternatively, the control signal can also be generated when the current drawn from a high-voltage on-board electrical system exceeds a critical value. The generation of the control signal can also, for example, take into account whether the internal combustion engine is being operated under full load (e.g., uphill travel, a lot of weight and/or trailer).

The control signal can also be determined based on a combination of the aforementioned factors. For example, the control signal can be generated by an energy management unit of the motor vehicle, by a battery manager or by power electronics.

Furthermore, in the method according to the invention, a control signal that provides information about the connection of the high-current consumer can be evaluated. For example, the control signal can be a signal of the engine control system, the signal activating a consumer such as a gearbox pump. The control method of the present invention can monitor the signal flow of an engine control system for the presence of the control signal, for example. This has the advantage that it is not necessary to intervene significantly in the engine control system in order to implement the method according to the invention.

After the control signal that provides information about the connection of the high-current consumer has been identified, the current consumption of the other consumer is advantageously reduced as far as possible, i.e. by a maximum amount. For example, if the power consumption of a gearbox pump at maximum load is 500 W and the power consumption of a cooling fan is 600 W, it is possible to compensate for a load peak generated by the gearbox pump at short notice by completely scaling down the current consumption of the cooling fan.

Alternatively, after the control signal that provides information about the connection of the high-current consumer has been identified, the current consumption of the other consumer is reduced by an amount that substantially corresponds to the current consumption of the high-current consumer. For this purpose, the energy management of the motor vehicle can store typical power values of the consumers, if the consumer to be reduced is a PWM (pulse-width-modulated) cooling fan, for example, this consumer can be driven in differentiated fashion through the use of pulse width modulation such that the current consumption can be adjusted. This has the advantage that the sum of the power remains virtually constant and can even be lower in the case of inductive consumers.

The present invention also relates to a control apparatus for a motor vehicle, which is configured to execute the methods described above. The control apparatus can be an energy management system of a motor vehicle, for example. The control apparatus can be embodied as a processor on which software that executes the methods described above is executed.

In other words, according to the invention there is provided a control configuration for a motor vehicle, including:

a control apparatus configured to identify that a high-current consumer of a low-voltage on-board electrical system is connected; and the control apparatus being configured to reduce a current consumption of a further consumer of the low-voltage on-board electrical system by an amount that corresponds to a current consumption of the high-current consumer, when the control apparatus identifies that the high-current consumer is connected.

Further advantageous refinements of the invention emerge from the dependent claims and the following description of preferred exemplary embodiments of the present invention.

Although the invention is illustrated and described herein as embodied in a method for controlling a consumer of a low-voltage on-board electrical system of a motor vehicle and a corresponding control apparatus for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DETAILED DESCRIPTION OF THE INVENTION

Figure 1:
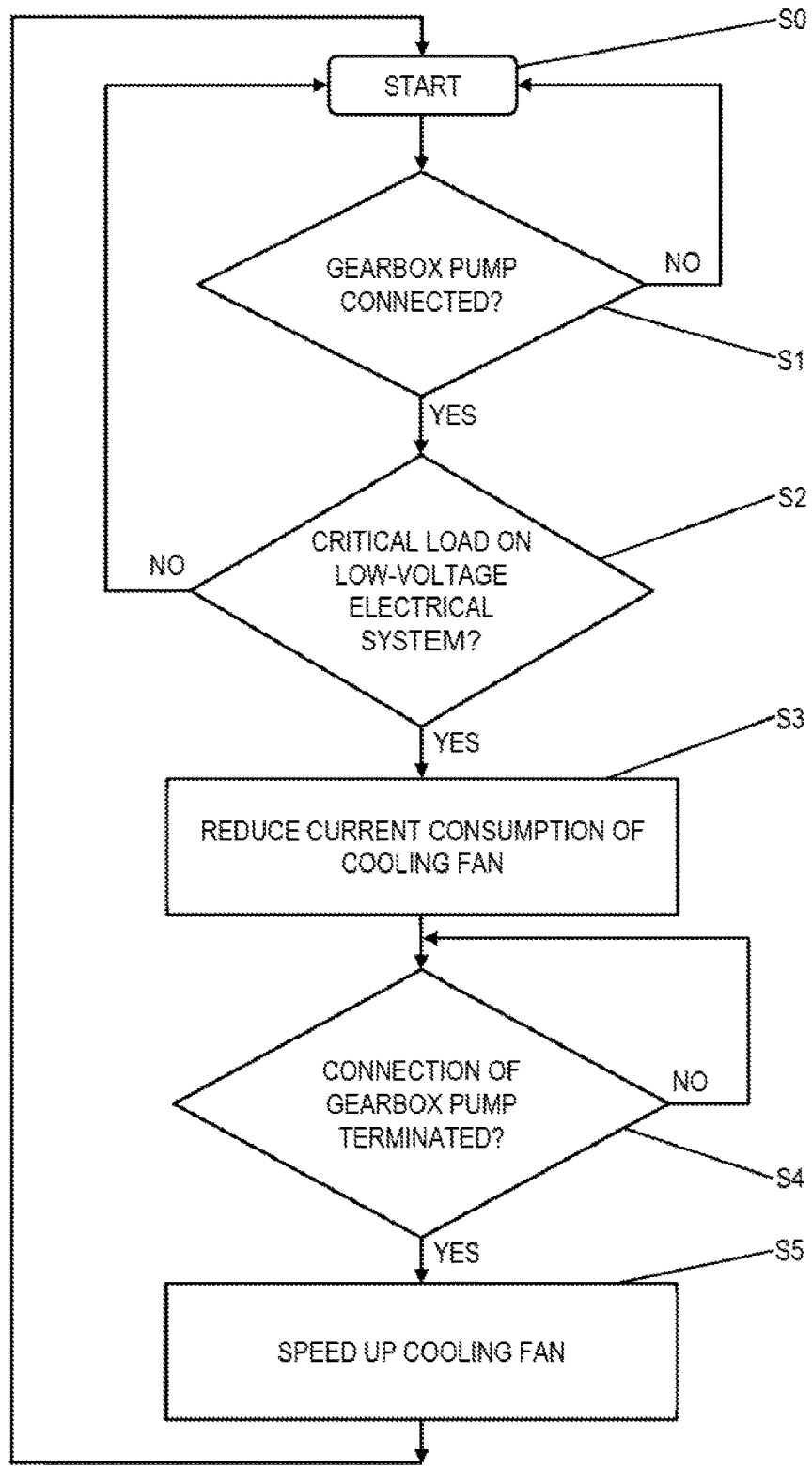
FIG. 1 is a flow chart schematically illustrating an exemplary embodiment of the method for controlling consumers of a low-voltage on-board electrical system of a motor vehicle in accordance with the invention.

Referring now to the figures of the drawing in detail and first, particularly, to FIG. 1 thereof, there is shown an exemplary embodiment of the method for controlling consumers (electrical loads) of a low-voltage on-board electrical system of a motor vehicle in accordance with the invention.

Referring to the control method of FIG. 1, the method starts in step S0.

In step S1, a control signal that indicates that a gearbox pump (500 W maximum consumption) is connected is evaluated. If it is identified that a gearbox pump is not connected, the method returns to the start S0. If it is identified that a gearbox pump is connected (switched into the circuit by e.g. being switched on), the method continues with step S2.

In step S2, a control signal that indicates a critical load on the low-voltage electrical system is evaluated. The control signal is a binary signal that is generated by the energy management of the motor vehicle, the signal indicating that there is a critical load present or, alternatively, that there is no critical load present. If there is no critical load on the low-voltage electrical system present, the method returns to the start S0. If the gearbox pump is switched on, the DC/DC converter (2.5 kW maximum power) might not provide enough power or there might not be enough power available in general. If such a critical load on the low-voltage electrical system is present, the method continues with step S3.

In step S3, the current consumption of a cooling fan is reduced. In this case, in particular, the electric PWM (pulse-width-modulated) cooling fan (600 W maximum consumption) is clocked very quickly from 100% down to 0 or is reduced to the lowest possible volume flow, by virtue of the fact that a corresponding control signal is sent to the cooling fan. The cooling fan is therefore disconnected, i.e. turned off, very quickly. Since the cooling system reacts with inertia to the cooling fan being disconnected, the cooling temperature does not increase rapidly but rather increases only slowly after the cooling fan has been disconnected. It is advantageous that an induction voltage is also formed as a result, the induction voltage additionally providing power. As a result, voltage peaks that would otherwise have a distorting effect are prevented.

In step S4, the control signal that indicates that a gearbox pump is connected is checked to determine whether or not the gearbox pump still requires current. If the gearbox pump has built up the required pressure, the gearbox pump is deactivated again by the engine control system such that the pump no longer consumes electrical power. Step S4 is executed until it is identified that the gearbox pump has finished being connected. If it is identified that the gearbox pump has finished being connected, then the method continues with step S5.

In step S5, the cooling fan is started up again in its previous operating state (100%) by virtue of the fact that a corresponding control signal is sent to the cooling fan.

The method finally returns to the start S0.

In this exemplary embodiment, under specific conditions, the cooling fan having a high power is "interlocked" or, respectively, interconnected with the high power of the gearbox pump. At the moment when the gearbox pump is switched on, the cooling fan is reduced to the lowest possible volume flow for a short time.

In this way, the method can be executed constantly in an energy management system in order to monitor the presence of current peaks and to compensate for such current peaks before they are able to form by disconnecting other components accordingly. As a result, it is possible to prevent overloading of the low-voltage on-board electrical system.

Figure 2:
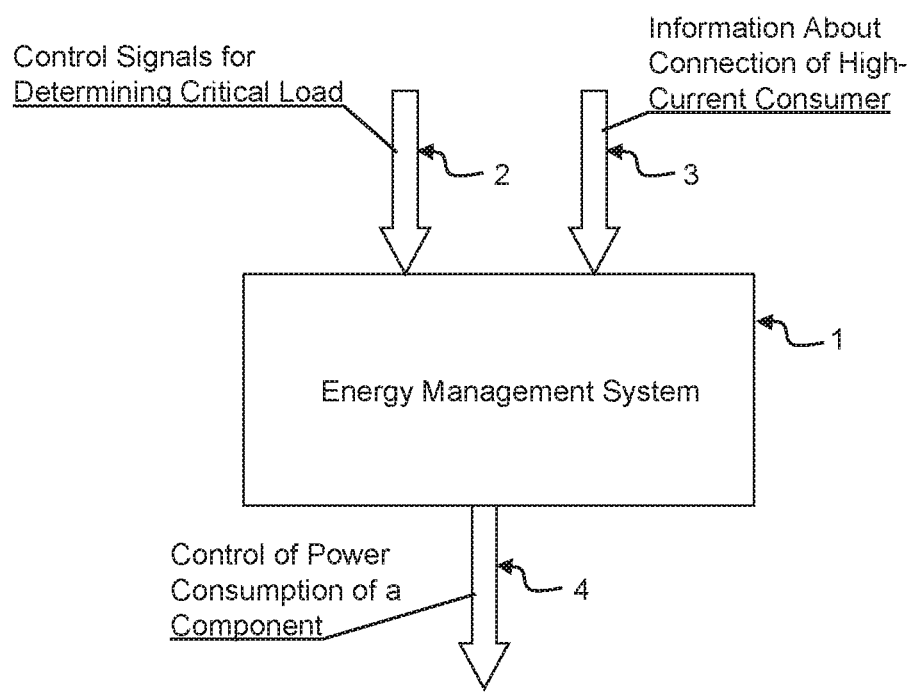
FIG. 2 is a schematic view of a control apparatus for controlling consumers of a low-voltage on-board electrical system of a motor vehicle in accordance with the invention.

With reference to the control apparatus of FIG. 2:

The energy management system 1 has an interface for receiving control signals 2, on the basis of which it is determined whether there is a critical load on the low-voltage electrical system present. The control signals 2 can be, for example, parameters of a low-voltage battery, which are obtained by the energy management system 1 from a battery manager of the low-voltage battery. The control signals 2 can furthermore be sensor data, from which the energy management system can determine the present current consumption of a wide variety of components of the on-board electrical system. The control signals 2 can furthermore be the output of power electronics, which provide information, for example about the operating state of a DC voltage converter, to the energy management system 1.

The energy management system 1 further has an interface for receiving a control signal 3, which provides information about the connection of a high-current consumer, in particular a gearbox pump. The energy management system 1 can obtain such a control signal 3, for example, directly from the respective components, or else from an engine control system. The energy management system 1 could also receive a plurality of such control signals 3 concerning different high-current consumers.

The energy management system 1 further has an interface for outputting a control signal 4, which controls the power consumption or, respectively, the current consumption of a component, in this case in particular a cooling fan. In the case of the cooling fan, the signal can be a PWM signal that is used to control the frequency of the cooling fan, for example. The energy management system 1 could also receive a plurality of such control signals 4 concerning different components.

The mentioned interfaces can include, for example, a vehicle data bus system and corresponding transmission electronics.

To the extent that the preceding text focused on an energy management system and an engine control system, a person skilled in the art will recognize that the functionality of these control systems can be realized in a processor and can be implemented as software. The functionality does not necessarily have to be separated into two separate hardware units; instead, the functionality can also be realized in a central vehicle processor, or else as a distributed system that is distributed over a plurality of components.

Furthermore, a person skilled in the art will recognize that the sequence of steps specified in the exemplary embodiments is not compulsory. For example, in the exemplary embodiment of FIG. 1, the steps S1 and S2 can also be interchanged.

LIST OF REFERENCE CHARACTERS

1 Energy management system
2 Control signals for determining a criticaload on the low-voltage electrical system
3 Control signal that provides information about the connection of a high-current consumer
4 Control signal that controls the power consumption of a component
S0 Start
S1 Identifying that a gearbox pump is connected
S2 Checking for a critical load on the low-voltage electrical system
S3 Reducing the current consumption of a cooling fan
S4 Checking whether the connection of the gearbox pump has been terminated
S5 Speeding up the cooling fan

What is claimed is:

1. A method for controlling a consumer of a low-voltage on-board electrical system of a motor vehicle, the method comprising:
providing a high-current consumer of the low-voltage on-board electrical system, and providing a further consumer of the low-voltage on-board electrical system; and
reducing a current consumption of the further consumer by an amount that corresponds to a current consumption of the high-current consumer, when it is identified that the high-current consumer is connected, wherein the further consumer, whose current value is reduced, is a PWM cooling fan, wherein the PWM cooling fan is driven in a differentiated manner by a pulse width modulation such that a current consumption is adjustable.

2. The method according to claim 1, wherein the further consumer that has its current value reduced is a consumer whose effect reacts with inertia to a reduction of its current value.

3. The method according to claim 1, wherein the high-current consumer is a gearbox pump.

4. A control configuration for a motor vehicle, comprising:
a control apparatus configured to identify that a high-current consumer of a low-voltage on-board electrical system is connected; and
said control apparatus being configured to reduce a current consumption of a further consumer of the low-voltage on-board electrical system by an amount that corresponds to a current consumption of the high-current consumer, when said control apparatus identifies that the high-current consumer is connected and said control apparatus being configured to evaluate a control signal that indicates a critical load on the low-voltage on-board electrical system and to reduce the current consumption of the further consumer if the control signal indicates a critical load on the low-voltage on-board electrical system.

5. A method for controlling a consumer of a low-voltage on-board electrical system of a motor vehicle, the method comprising:
providing a high-current consumer of the low-voltage on-board electrical system, and providing a further consumer of the low-voltage on-board electrical system, wherein the further consumer has an inductance such that an induction voltage is generated when a current value of the further consumer is reduced, wherein the induction voltage additionally feeds the low-voltage on-board electrical system; and
reducing a current consumption of the further consumer by an amount that corresponds to a current consumption of the high-current consumer, when it is identified that the high-current consumer is connected.

6. A method for controlling a consumer of a low-voltage on-board electrical system of a motor vehicle, the method comprising:
providing a high-current consumer of the low-voltage on-board electrical system, and providing a further consumer of the low-voltage on-board electrical system;
evaluating a control signal that provides information about a connection of the high-current consumer; and
reducing a current consumption of the further consumer by an amount that corresponds to a current consumption of the high-current consumer, when it is identified that the high-current consumer is connected.

7. The method according to claim 6, which comprises reducing the current consumption of the further consumer by a maximum amount, after identifying the control signal that provides information about the connection of the high-current consumer.

* * * * *